United States Patent
Yang

(10) Patent No.: US 7,592,790 B2
(45) Date of Patent: Sep. 22, 2009

(54) START-UP CIRCUIT WITH FEEDFORWARD COMPENSATION FOR POWER CONVERTERS

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 192 days.

(21) Appl. No.: 11/406,309

(22) Filed: Apr. 19, 2006

(65) Prior Publication Data
US 2007/0247879 A1   Oct. 25, 2007

(51) Int. Cl.
*G05F 1/573* (2006.01)
(52) U.S. Cl. ............. 323/277; 323/284; 323/908; 363/49
(58) Field of Classification Search ............ 363/49; 323/274, 277, 280, 284, 901, 908; 327/91, 327/92
See application file for complete search history.

(56) References Cited

U.S. PATENT DOCUMENTS

| | | | | |
|---|---|---|---|---|
| 4,879,478 A | * | 11/1989 | Gershon | 327/92 |
| 5,721,480 A | * | 2/1998 | Morioka | 320/134 |
| 5,790,526 A | * | 8/1998 | Kniess et al. | 370/257 |
| 6,501,255 B2 | * | 12/2002 | Pomeroy | 323/280 |

\* cited by examiner

*Primary Examiner*—Jessica Han
(74) *Attorney, Agent, or Firm*—Rosenberg, Klein & Lee

(57) ABSTRACT

A bleeding resistor is required to discharge EMI filter of the power converter for the safety purpose. In order to save power and reduce device count, the present invention further uses this bleeding resistor for both start-up and feedforward compensation. It includes an input terminal for connecting the bleeding resistor. A voltage divider is connected to the input terminal. A sample-and-hold circuit samples and holds a voltage signal from the voltage divider. After that, a low-pass filter is connected to the sample-and-hold circuit to generate an offset signal in accordance with the voltage signal. The offset signal is connected to a limit circuit to generate a limit signal that limits the switching current of the power converter.

12 Claims, 4 Drawing Sheets

US 7,592,790 B2

START-UP CIRCUIT WITH FEEDFORWARD COMPENSATION FOR POWER CONVERTERS

BACKGROUND OF THE INVENTION

1. Field of the Invention

The present invention relates to power converters. More particularly, the present invention relates to the control circuit of switching power converters.

2. Background of the Invention

The switching power converter is a traditional technology to control the output power and achieve the regulation. Various protection functions, such as over-voltage and over-current protection are built-in in the power converter to protect the power converter and the connected circuits from permanent damage. The function of output power limit is generally used for the over-load and short circuit protection. Referring to FIG. 1, a traditional switching power converter uses a control circuit 50. The operation of the power converter starts on the charging of a start-up capacitor 65 coupled to the supply terminal VCC of the control circuit 50 via a serial start-up resistor 30 for providing a supply voltage $V_{CC}$ by an input voltage $V_{DC}$ when the power is turned on until the supply voltage $V_{CC}$ is charged up to the threshold voltage, and then the output terminal OUT of the control circuit 50 starts to output a switching signal $V_{PWM}$ and drive the power converter. After the start-up, the supply voltage $V_{CC}$ is provided from the auxiliary bias winding of a transformer 20 through a rectifier 60.

A power transistor 10 is coupled to the primary winding of the transformer 20 and the output terminal OUT. The power transistor 10 switches the transformer 20 to control the output power of the power converter in response to the switching signal $V_{PWM}$. A resistor 15 that is connected serially with the power transistor 10 determines the maximum output power of the power converter. The method is to connect a resistor 40 to the current-sense terminal VS of the control circuit 50. If the voltage $V_S$ is greater than a maximum threshold, the control circuit 50 will disable the switching signal $V_{PWM}$, and restrict the maximum output power of the power converter. However, the maximum output power is affected by a response time $T_D$. From the moment that the voltage $V_S$ in the current-sense terminal VS is detected higher than the maximum threshold to the moment that the switching signal $V_{PWM}$ of the control circuit 50 is actually turned off, there is a delay time $T_D$. The delay time $T_D$ causes a different over-power protection in response to the change of the input voltage $V_{DC}$.

A resistor 35 is added between the input voltage $V_{DC}$ and the current-sense terminal VS for the feedforward compensation. The feedforward compensation is used to compensate the difference of the output power caused by the input voltage $V_{DC}$ and the delay time $T_D$. By properly selecting the resistance of the resistor 35, an identical output power limit for the low line and high line voltage inputs can be obtained. Because the resistors 30 and 35 will cause significant power loss, especially in high line voltage input. Using a resistor for both feedforward compensation and start-up are proposed, it is U.S. Pat. No. 6,611,439 "PWM controller for controlling output power limit of a power supply" by Yang, et al. Moreover, a prior art U.S. Pat. No. 6,906,934 "Integrated start-up circuit with reduced power consumption" by Yang, et al. was developed to further reduce power consumption. However, the skill innovated in U.S. Pat. No. 6,906,934 is inadequate to be applied to the apparatus of U.S. Pat. No. 6,611,439. Therefore, the objective of present invention is to solve the problem of prior arts. In order to save power and reduce device count, a resistor is used for the start-up, feedforward compensation and safety purposes.

SUMMARY OF INVENTION

In order to save power and reduce device count, present invention uses a bleeding resistor for both start-up and feedforward compensation. The bleeding resistor is required to discharge EMI filter of the power converter for the safety purpose. The circuit of present invention includes an input terminal to connect the bleeding resistor for the start-up. A voltage divider is connected to the input terminal. A sample-and-hold circuit is further connected to the voltage divider to sample and hold a voltage signal from the voltage divider. After that, a low-pass filter is utilized to filter out the line frequency ripple and generate an offset signal in accordance with the voltage signal. The low-pass filter is a sampling filter. The offset signal is connected to a limit circuit to generate a limit signal. The limit signal limits a switching current of the power converter.

BRIEF DESCRIPTION OF DRAWINGS

The accompanying drawings are included to provide a further understanding of the invention, and are incorporated in and constitute a part of this specification. The drawings illustrate embodiments of the invention together with the description, which serve to explain the principles of the invention.

DETAILED DESCRIPTION

Figure 1:
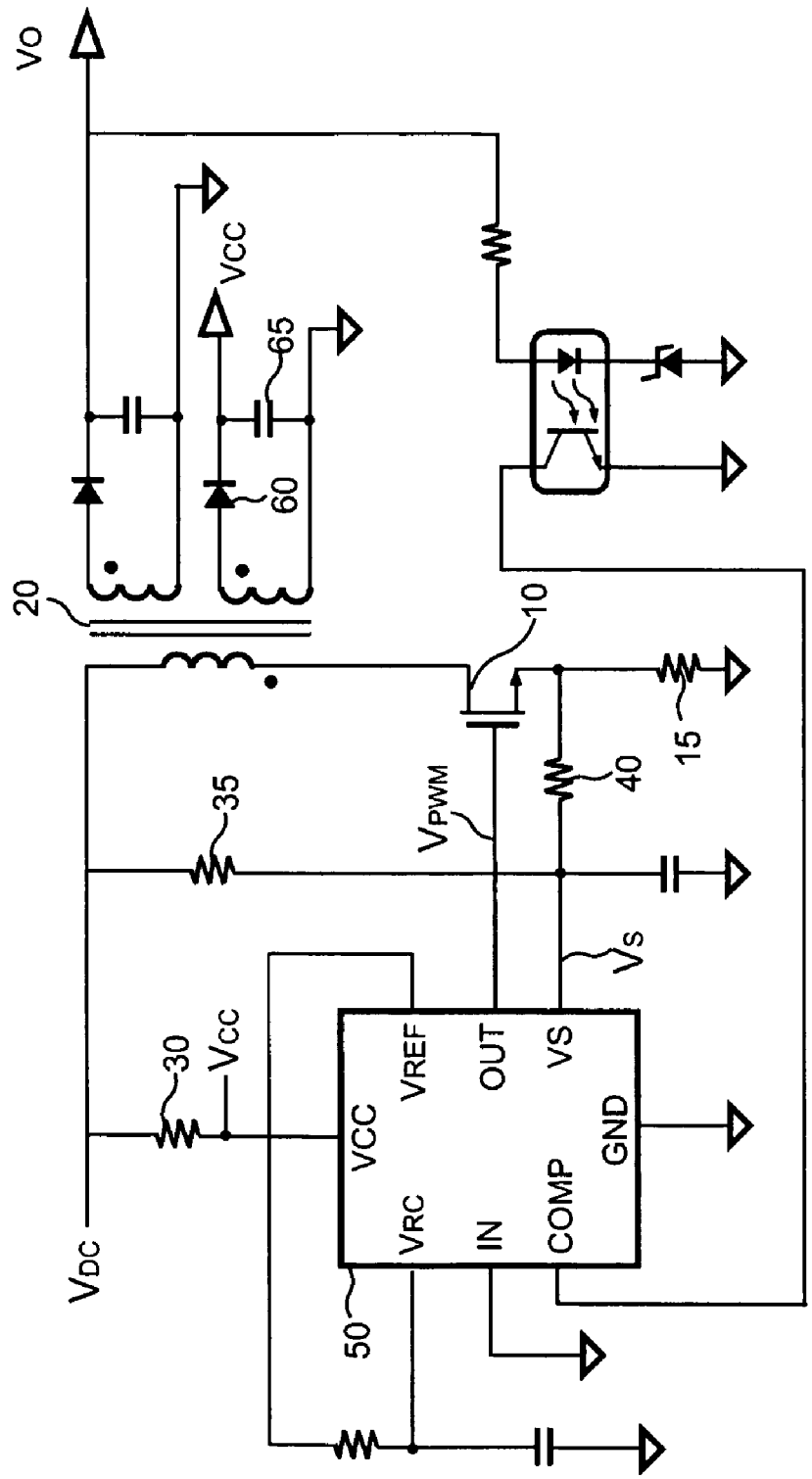
FIG. 1 shows a circuit diagram of a prior art switching power converter.
Figure 2:
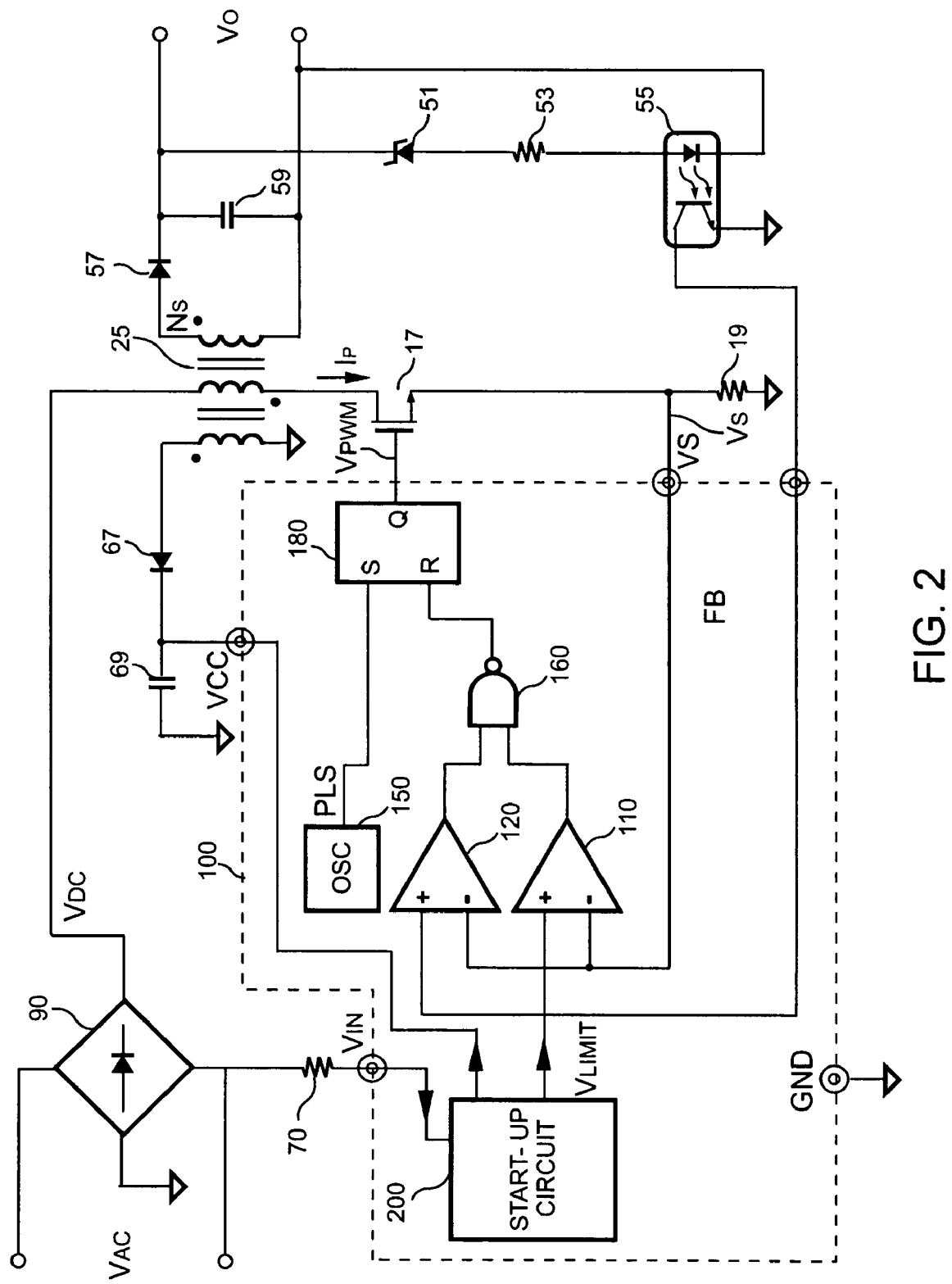
FIG. 2 shows a circuit diagram of a switching power converter in accordance with the present invention.

FIG. 2 schematically shows a switching power converter according to the present invention. A control circuit 100 comprises a start-up circuit 200, a first comparator 110, a second comparator 120, a NAND gate 160, a flip-flop 180 and an oscillator 150, which serve to provide a pulse signal PLS for the flip-flop 180. A bleeding resistor 70 is required to discharge EMI filter of the power converter for the safety purpose. In order to save power and reduce device count, the present invention further uses the bleeding resistor 70 for both start-up and feedforward compensation. The bleeding resistor 70 is connected between an input voltage $V_{AC}$ and an input terminal $V_{IN}$ of the control circuit 100 for the start-up. A bridge circuit 90 is coupled between the input voltage $V_{AC}$ and the bleeding resistor 70. The bridge circuit 90 is further coupled to the primary winding of a transformer 25. Once the power converter is turned on, the input voltage $V_{AC}$ is applied to the start-up circuit 200 through the bleeding resistor 70, and starts to charge up a start-up capacitor 69 for providing a supply voltage $V_{CC}$ to a supply terminal VCC of the control circuit 100. When the voltage in the start-up capacitor 69 reaches the threshold voltage, the control circuit 100 starts to operate and outputs a switching signal $V_{PWM}$. And after that, the supply voltage $V_{CC}$ will be provided from the auxiliary winding of the transformer 25 via a diode 67.

A limit signal $V_{LIMIT}$ of the start-up circuit 200 is used to determine a maximum current-sense voltage, which is connected to the positive input terminal of the first comparator 110. The positive input terminal of the second comparator 120 is connected to a feedback terminal FB of the control circuit 100 for the output regulation of the power converter. An optical-coupler 55 is coupled between the secondary winding of the transformer 25 and the feedback terminal FB to form a feedback control loop. The output voltage $V_O$ of the power converter is conducted to the optical-coupler 55 through a Zener diode 51 and a resistor 53. The secondary winding of the transformer 25 outputs the output voltage $V_O$ through a rectifier 57. A filter capacitor 59 is coupled to the rectifier 57 and the secondary winding.

The negative input terminals of the first comparator 110 and second comparator 120 are connected together to the source terminal of a power transistor 17 through a current-sense terminal VS of the control circuit 100. The output terminals of the first comparator 110 and the second comparator 120 are connected to the input terminals of the NAND gate 160. The output terminal of the NAND gate 160 is coupled to the reset terminal of the flip-flop 180. The output terminal of the flip-flop 180 is coupled to the gate terminal of the power transistor 17 and outputs the switching signal $V_{PWM}$. The drain terminal of the power transistor 17 is connected to the primary winding of the transformer 25.

A switching current $I_P$ flowing through a resistor 19 produces a sense voltage $V_S$ in the resistor 19. The first comparator 110 will compare the sense voltage $V_S$ and the voltage of the limit signal $V_{LIMIT}$. When the sense voltage $V_S$ is greater than the voltage of the limit signal $V_{LIMIT}$, the first comparator 110 will output a logic low signal to the NAND gate 160. Thus, the NAND gate 160 will output a logic high signal to the flip-flop 180 to reset the flip-flop 180 to disable the switching signal $V_{PWM}$ to turn off the power transistor 17. Therefore, the output power limit is achieved.

Figure 3:
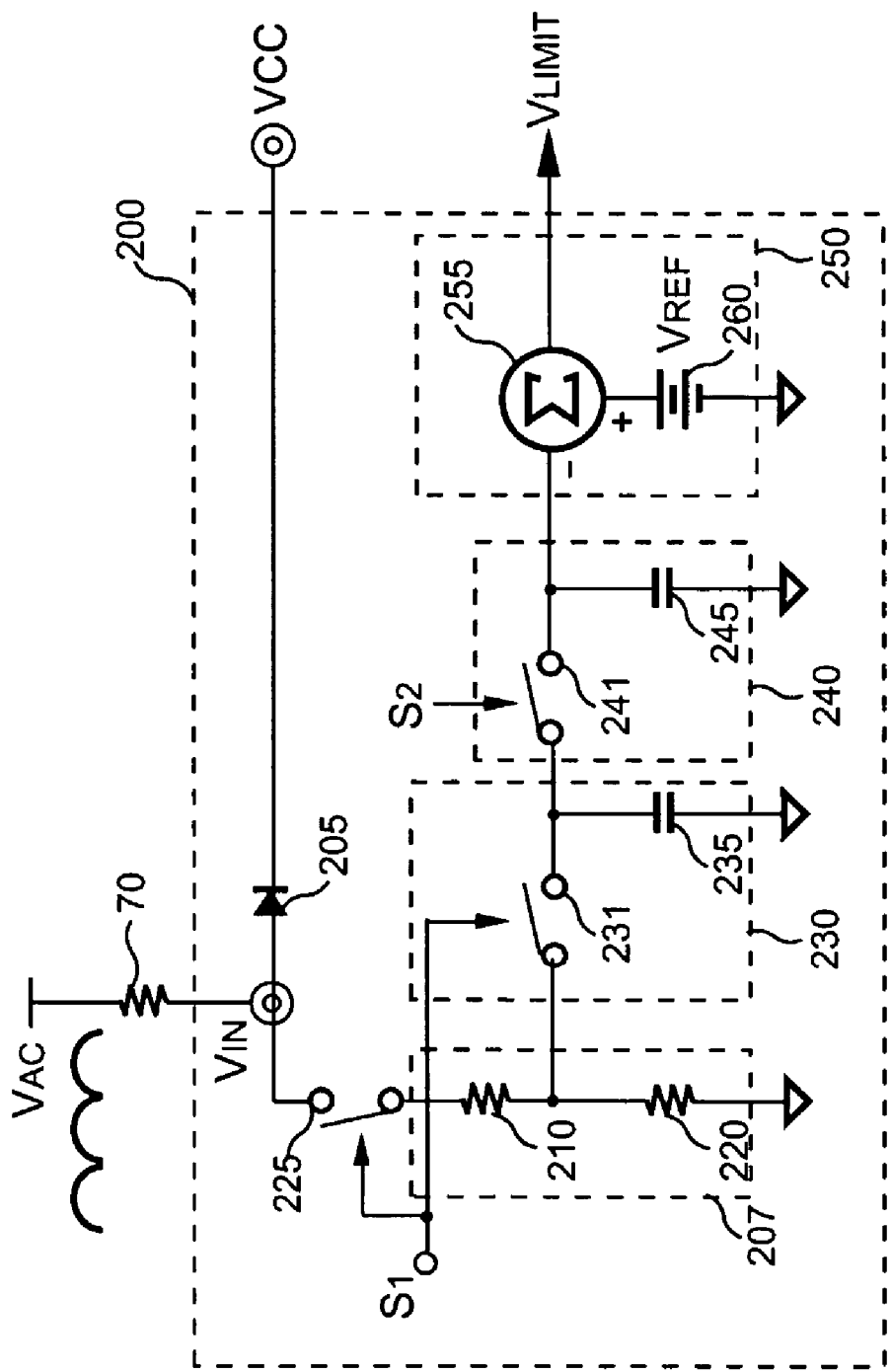
FIG. 3 shows a circuit diagram of a start up circuit with feedforward compensation in accordance with the present invention.

FIG. 3 is a preferred embodiment of the start up circuit 200. The input terminal $V_{IN}$ of the control circuit 100 is connected to the input voltage $V_{AC}$ of the power converter via the bleeding resistor 70. A diode 205 is coupled from the input terminal $V_{IN}$ to the supply terminal VCC for providing power source to the control circuit 100 of the power converter. A voltage divider 207 comprises resistors 210 and 220. The resistor 210 and the resistor 220 are connected in series. The voltage divider 207 is coupled to the input terminal $V_{IN}$ via a switch 225. A sample-and-hold circuit 230 is coupled to the voltage divider 207 to sample and hold a voltage signal from the voltage divider 207. A low-pass filter 240 is coupled to the sample-and-hold circuit 230 to generate an offset signal in accordance with the voltage signal. A limit circuit 250 is coupled to the low-pass filter 240 for generating the limit signal $V_{LIMIT}$ in accordance with a reference signal 260 and the offset signal.

The limit circuit 250 comprises an adder 255 and the reference signal 260. The reference signal 260 is connected to the positive input terminal of the adder 255. The offset signal is connected to the negative input terminal of the adder 255. Therefore, the limit signal $V_{LIMIT}$ is decreased in response to the increase of the offset signal. The limit signal $V_{LIMIT}$ is utilized to limit the switching current $I_P$ of the power converter. Accordingly, the feedforward compensation is achieved. The increase of the input voltage $V_{AC}$ will reduce the switching current $I_P$ of the power converter. It is learned from above description that the present invention is a circuit with detection. The detection could be the line voltage detection.

The sample-and-hold circuit 230 comprises a first sample switch 231 and a first capacitor 235. The first sample switch 231 is connected to the voltage divider 207. The first capacitor 235 is connected to the first sample switch 231 to generate the voltage signal. The first sample switch 231 is controlled by a first sample signal $S_1$ that is divided from the switching signal $V_{PWM}$ of the power converter. The first sample signal $S_1$ also controls the switch 225. The low pass filter 240 comprises a second sample switch 241 and a second capacitor 245. The second sample switch 241 is connected to the first capacitor 235 of the sample-and-hold circuit 230. The second capacitor 245 is connected to the second sample switch 241 to generate the offset signal. The second sample switch 241 is controlled by a second sample signal $S_2$ that is synchronized with the first sample signal $S_1$. In order to accomplish the low pass filter the capacitance of the second capacitor 245 is higher than the capacitance of the first capacitor 235.

Figure 4:
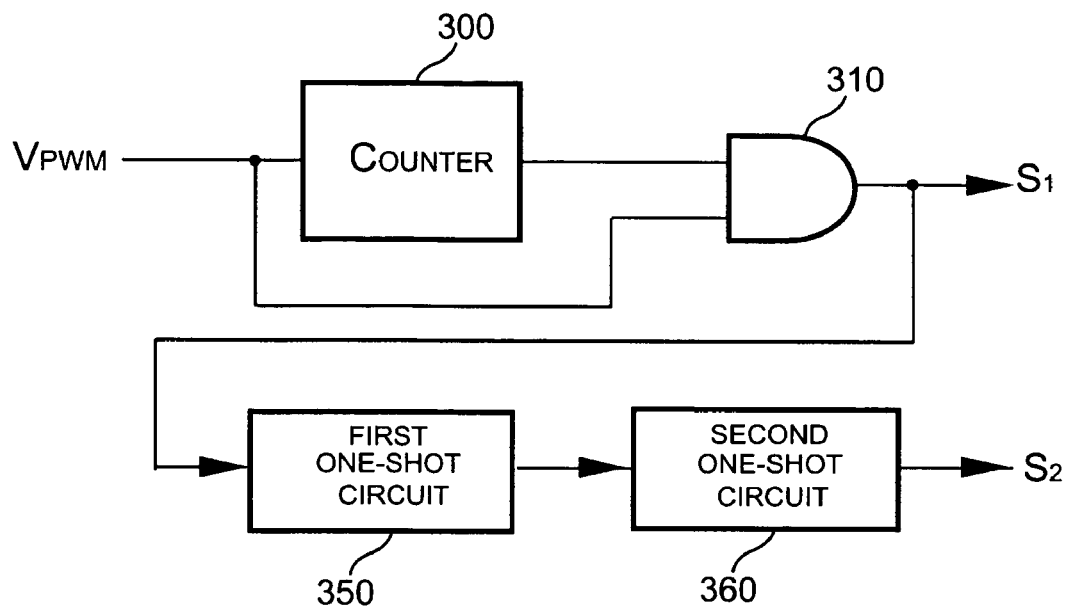
FIG. 4 shows a circuit diagram of a generating circuit for generating sample signals in accordance with the present invention.
Figure 5:
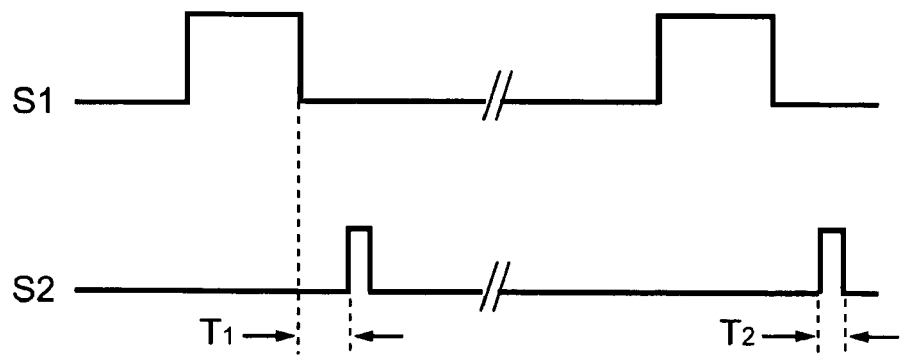
FIG. 5 shows waveforms of the sample signals in accordance with the present invention.

FIG. 4 shows a circuit diagram of a generating circuit for generating the first sample signal $S_1$ and the second sample signal $S_2$. The input terminal of a counter 300 is connected to the output terminal of the flip-flop 180 to receive the switching signal $V_{PWM}$. The output terminal of the counter 300 is connected to the input terminal of an AND gate 310. Another input terminal of the AND gate 310 is connected to the output terminal of the flip-flop 180 to receive the switching signal $V_{PWM}$. The output terminal of the AND gate 310 generates the first sample signal $S_1$. A first one-shot circuit 350 is connected to receive the first sample signal $S_1$. The output terminal of the first one-shot circuit 350 is connected to the input terminal of a second one-shot circuit 360. The second one-shot circuit 360 generates the second sample signal $S_2$. The first one-shot circuit 350 determines a delay time $T_1$ in response to the falling edge of the first sample signal $S_1$. The second one-shot circuit 360 determines a pulse width $T_2$ for the second sample signal $S_2$. FIG. 5 shows waveforms of the sample signals $S_1$ and $S_2$.

It is to be understood that the voltage of the limit signal $V_{LIMIT}$ will become a function of the input voltage $V_{AC}$. The variation of the maximum switching current $I_P$ is inversely proportion to the deviation of the input voltage $V_{AC}$. The low-pass filter filters out the line frequency ripple of the input voltage $V_{AC}$. The bleeding resistor can therefore be used for the start-up, which further save the power. By properly select the resistance of the bleeding resistor can achieve an identical output power limit for the low line voltage and high line voltage input such as 90 Vac and 264 Vac.

It will be apparent to those skilled in the art that various modifications and variations can be made to the structure of the present invention without departing from the scope or spirit of the invention. In view of the foregoing, it is intended that, the present invention cover modifications and variations of this invention provided they fall within the scope of the following claims and their equivalents.

What is claimed is:

1. A start-up circuit, comprising:
an input terminal coupled to an input voltage of a power converter via a bleeding resistor;
a diode coupled from the input terminal to a supply terminal of a control circuit of the power converter for providing power source to the control circuit;
a voltage divider coupled to the input terminal via a switch;
a sample-and-hold circuit coupled to the voltage divider to sample and hold a voltage signal from the voltage divider;

a low-pass filter coupled to the sample-and-hold circuit to generate an offset signal in accordance with the voltage signal; and an adder coupled to the low-pass filter to generate a limit signal in accordance with a reference signal and the offset signal;

wherein the limit signal is utilized to limit a switching current of the power converter.

2. The start-up circuit as claimed in claim 1, in which the voltage divider includes resistors connected in series.

3. The start-up circuit as claimed in claim 1, in which the sample-and-hold circuit comprising:

a first sample switch connected to the voltage divider; and a first capacitor connected to the first sample switch to generate the voltage signal;

wherein the first sample switch is controlled by a first sample signal that is divided from a switching signal of the power converter.

4. The start-up circuit as claimed in claim 3, in which the low pass filter comprising:

a second sample switch connected to the first capacitor of the sample-and-hold circuit; and a second capacitor connected to the second sample switch to generate the offset signal;

wherein the second sample switch is controlled by a second sample signal that is synchronized with the first sample signal.

5. The start-up circuit as claimed in claim 4, in which the capacitance of the second capacitor is higher than the capacitance of the first capacitor.

6. A circuit with line voltage detection, comprising:

an input terminal coupled to an input voltage of a power converter via a bleeding resistor;

a voltage divider coupled to the input terminal;

a sample-and-hold circuit coupled to the voltage divider to sample and hold a voltage signal from the voltage divider;

a low-pass filter coupled to the sample-and-hold circuit to generate an offset signal in accordance with the voltage signal; and a limit circuit coupled to the low-pass filter to generate a limit signal in response to the offset signal;

wherein the limit signal limits a switching current of the power converter.

7. The circuit with line voltage detection as claimed in claim 6, in which the voltage divider includes resistors.

8. The circuit with line voltage detection as claimed in claim 6, in which the sample-and-hold circuit comprising:

a first sample switch connected to the voltage divider; and a first capacitor connected to the first sample switch to generate the voltage signal;

wherein the first sample switch is controlled by a first sample signal that is divided from a switching signal of the power converter.

9. The circuit with line voltage detection as claimed in claim 8, in which the low pass filter comprising:

a second sample switch connected to the first capacitor of the sample-and-hold circuit; and a second capacitor connected to the second sample switch to generate the offset signal;

wherein the second sample switch is controlled by a second sample signal that is synchronized with the first sample signal.

10. The circuit with line voltage detection as claimed in claim 9, in which the capacitance of the second capacitor is higher than the capacitance of the first capacitor.

11. A circuit with detection, comprising:

an input terminal coupled to an input voltage of a power converter;

a voltage divider coupled to the input terminal;

a sample-and-hold circuit coupled to the voltage divider to sample and hold a voltage signal from the voltage divider; and a limit circuit generating a limit signal in response to the voltage signal;

wherein the limit signal limits a switching current of the power converter.

12. The circuit with detection as claimed in claim 11, in which the sample-and-hold circuit comprising:

a first sample switch connected to the voltage divider; and a first capacitor connected to the first sample switch to generate the voltage signal;

wherein the first sample switch is controlled by a first sample signal that is divided from a switching signal of the power converter.

* * * * *